United States Patent
Hungenberg et al.

Patent Number: 5,296,431
Date of Patent: Mar. 22, 1994

[54] ZIEGLER-NATTA CATALYST SYSTEMS CONTAINING ORGANOMETALLIC COMPOUNDS

[75] Inventors: Klaus-Dieter Hungenberg, Birkenau; Juergen Kerth, Carlsberg, both of Fed. Rep. of Germany

[73] Assignee: BASF Aktiengesellschaft, Ludwigshafen, Fed. Rep. of Germany

[21] Appl. No.: 737,741

[22] Filed: Jul. 30, 1991

[30] Foreign Application Priority Data

Aug. 1, 1990 [DE] Fed. Rep. of Germany ....... 4024421

[51] Int. Cl.⁵ .................. C08F 4/654; C08F 10/06
[52] U.S. Cl. ................... 502/110; 502/125; 502/127; 526/125; 526/351
[58] Field of Search ............. 502/104, 116, 114, 115, 502/110, 125, 127

[56] References Cited

U.S. PATENT DOCUMENTS

| | | | |
|---|---|---|---|
| 4,383,938 | 5/1983 | Langer | 526/125 |
| 4,567,154 | 1/1986 | Bacskai | 526/125 |
| 4,857,613 | 8/1989 | Zolk et al. | |
| 4,900,798 | 2/1990 | Keith et al. | 526/152 |
| 5,082,818 | 1/1992 | Matsuura et al. | 526/125 |

FOREIGN PATENT DOCUMENTS 0086473 8/1983 European Pat. Off.
0171200 2/1986 European Pat. Off.

*Primary Examiner*—Edward J. Smith
*Attorney, Agent, or Firm*—Keil & Weinkauf

[57] ABSTRACT

Ziegler-Natta-type catalyst systems containing, as active constituents,
  a) a titanium-containing solid component which also contains magnesium, halogen and a carboxylic acid ester as electron donor,
  b) an aluminum component,
  c) a further electron-donor component, and, as an additional component,
  d) an organometallic compound of the general formula A or B $$M^1 R^1 \quad (A)$$

$$M^2 R^1 R^2 \quad (B)$$

where $M^1$ is an element from main group I, and $M^2$ is an element from main group II of the Periodic Table, and $R^1$ and $R^2$ are identical or different $C_1$–$C_{10}$-alkyl, $C_6$–$C_{12}$-aryl, $C_6$–$C_{12}$-arylalkyl, or 5- to 7-membered cycloalkyl, which may itself carry $C_1$–$C_8$-alkyl groups, can be used to prepare polymers which have, in particular, a low proportion of very fine grains.

4 Claims, No Drawings

ZIEGLER-NATTA CATALYST SYSTEMS CONTAINING ORGANOMETALLIC COMPOUNDS

The present invention relates to novel Ziegler-Natta-type catalyst systems which contain, as active constituents, a) a titanium-containing solid component which also contains magnesium, halogen and a carboxylic acid ester as electron donor,
b) an aluminum component,
c) a further electron-donor component, and, as an additional component,
d) an organometallic compound of the general formula A or B $$M^1R^1 \quad \text{(A)}$$

$$M^2R^1R^2 \quad \text{(B)}$$

where $M^1$ is an element from main group I, and $M^2$ is an element from main group II of the Periodic Table, and $R^1$ and $R^2$ are identical or different $C_1$–$C_{10}$-alkyl, $C_6$–$C_{12}$-aryl, $C_6$–$C_{12}$-arylalkyl, or 5- to 7-membered cycloalkyl, which may itself carry $C_1$–$C_8$-alkyl groups.

The present invention furthermore relates to the preparation of catalyst systems of this type, to the preparation of propylene polymers using these catalyst systems, to the polymers obtainable by this process, and to films and moldings made from these polymers.

Ziegler-Natta-type catalyst systems have been disclosed, inter alia, in EP-B 14523, EP-A-23425, EP-A-45975, EP-A-195 497 and U.S. Pat. No. 4,857,613. These systems are used, in particular, for polymerizing a-olefins and contain, inter alia, compounds of polyvalent titanium, aluminum halides and/or alkylaluminum compounds, and electron donors, in particular silicon compounds, ethers, carboxylic acid esters, ketones and lactones, which are used on the one hand in combination with the titanium compound and on the other hand as a cocatalyst.

In order to ensure economical production of polyolefins, catalyst systems of this type must have, inter alia, high productivity. For the purposes of the present invention, this is taken to mean the ratio between the amount of polymer formed and the amount of catalyst employed. It is also necessary for the resultant polymers to be as crystalline and stereospecific as possible, ie. the proportion of xylene-soluble polypropylene should be as low as possible.

The prior art only provides a limited achievement of these two objects simultaneously. Thus, for example, EP-A 86473 discloses a catalyst system in which the electron donor, as a constituent of the titanium-containing solid component, is a carboxylic acid ester and the cocatalyst is, inter alia, a silicon compound; although this system has satisfactory productivity, it is in need of improvement with respect to the stereospecificity of the resultant polymers. Furthermore, EP-A 171 200 describes a Ziegler-Natta catalyst system which contains, inter alia, a carboxylic acid ester as a constituent of the titanium-containing solid component, and silicon and aluminum compounds as cocatalysts. This catalyst system facilitates the preparation of polypropylenes of high stereospecificity, but, in addition to unsatisfactory productivity, has the further disadvantage of an excessively broad grain size distribution in the resultant polymer.

In addition to these properties, which are particularly important for processing of the polymers, a low halogen content in the polyolefin is also of importance in order to enable the use of such materials in combination with corrosion-susceptible materials. To this end, it is necessary, in particular, considerably to reduce the halogen content in the polymer.

U.S. Pat. No. 4,857,613 describes a catalyst system which contains, as constituents of the titanium-containing solid component, a benzenecarboxylic acid derivative as well as titanium, magnesium, halogen and silica gel. Aluminum compounds and organosilicon compounds are also used in this system as cocatalysts. This catalyst system makes it possible to prepare polyolefins of high stereo-specificity and containing small amounts of catalyst residues and has, in addition, high productivity. However, the polymers obtained are occasionally not entirely free from a certain very fine dust content, which can, in particular in continuous processes, result in problems, for example in blockages in the parts of the plant downstream of the reactor.

It is an object of the present invention to develop a novel catalyst system using which the outlined disadvantages can be substantially overcome and using which it is possible to prepare, in high productivity, polymers of propylene which have high crystallinity, a low content of catalyst residues, and in particular an extremely low proportion of very fine grains.

We have found that this object is achieved by the novel catalyst system described in the claims.

The titanium compound used to prepare the titanium-containing solid component a) is generally a halide or alkoxide of trivalent or tetravalent titanium, preference being given to the chlorides, in particular titanium tetrachloride. The titanium-containing solid component advantageously contains a finely divided carrier, for which purpose silica, aluminum and alumino-silicates of the empirical formula $SiO_2 \cdot aAl_2O_3$ where a is from 0.001 to 2, in particular from 0.01 to 0.5, have proven successful.

The preferred carriers have a particle diameter of from 0.1 to 1000 μm, in particular from 1 to 500 μm, a pore volume of from 0.1 to 10 cm$^3$/g, in particular from 1.0 to 5.0 CM$^3$/g, and a specific surface area of from 10 to 1000 m$^2$/g, in particular from 100 to 500 m$^2$/g.

Further constituents of the titanium-containing solid component are, inter alia, compounds of magnesium, for example magnesium halides, alkylmagnesium compounds, arylmagnesium compounds, alkoxymagnesium compounds and aryloxymagnesium compounds, particular preference being given to magnesium dichloride, magnesium dibromide and di($C_1$–$C_{10}$-alkyl)magnesium compounds. This component also contains halogen, preferably chlorine or bromine.

Besides the trivalent or tetravalent titanium compounds, the carrier, the magnesium compound and the halogen, the titanium-containing solid component also contains electron-donor compounds, for example monofunctional or polyfunctional carboxylic acids, carboxylic anhydrides and carboxylic acid esters, furthermore ketones, ethers, alcohols, lactones, or organophosphorus or organosilicon compounds. Preferred electron donors in the titanium-containing solid component are phthalic acid derivatives of the general formula I

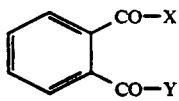

(I)

where X and Y are each chlorine or $C_1$- to $C_{10}$-alkoxy, or together are oxygen. Particularly preferred electron donors are phthalic acid esters, where X and Y are $C_1$-$C_8$-alkoxy, for example methoxy, ethoxy, propoxy or butoxy.

Further preferred electron donors in the titanium-containing solid component are, inter alia, diesters of 3- or 4-membered, substituted or unsubstituted cycloalkyl-1,2-dicarboxylic acids, and monoesters of substituted or unsubstituted benzophenone-2-carboxylic acids. The hydroxyl compounds used in these esters are the alcohols which are customary in esterification reactions, inter alia $C_1$- to $C_{15}$-alkanols, $C_5$- to $C_7$-cycloalkanols, which may themselves carry $C_1$- to $C_{10}$-alkyl groups, furthermore phenols, naphthols and the $C_1$- to $C_{10}$-alkyl derivatives of these compounds.

The titanium-containing solid component can be prepared by conventional methods, for example as described in EP-A 45 975, EP-A 45 977, EP-A 86 473, EP-A 171 200, GB-A 2,111,066 and U.S. Pat. No. 4,857,613.

The titanium-containing solid component is preferably prepared by the following two-step process.

In the first step, a solution of a magnesium-containing compound in a liquid alkane is first added to a finely divided carrier, preferably silica or $SiO_2 \cdot aAl_2O_3$ where a is from 0.001 to 2, in particular from 0.01 to 0.5, and the mixture is then stirred at from 10 to 120° C. for from 0.5 to 5 hours. From 0.1 to 1 mol of the magnesium compound is preferably employed per mol of the carrier. A halogen or a hydrogen halide, in particular chlorine or hydrogen chloride, in an at least two-fold, preferably at least five-fold, molar excess, based on the magnesium-containing compound, is then added with constant stirring. A $C_1$- to $C_8$-alkanol, in particular ethanol, a halide or an alkoxide of trivalent or tetravalent titanium, in particular titanium tetrachloride, and an electron donor, in particular a phthalic acid derivative of the general formula I, are then added. From 1 to 5 mol, in particular from 2 to 4 mol, of alkanol, from 2 to 20 mol, in particular from 4 to 10 mol, of trivalent or tetravalent titanium and from 0.01 to 1 mol, in particular from 0.1 to 1.0 mol, of the electron donor are employed per mol of magnesium in the solid obtained from the first step. The solution is stirred at from 10 to 150° C. for one hour or more, and the resultant solid is subsequently filtered off and washed with a liquid alkane, preferably with hexane or heptane.

In the second step, the solid obtained in the first step is extracted for several hours at from 100 to 150° C. with excess titanium tetrachloride or an excess of a solution of titanium tetrachloride in an inert solvent, preferably an alkylbenzene, the solvent containing 5% by weight or more of titanium tetrachloride. The product is then washed with a liquid alkane until the content of titanium tetrachloride in the washings is less than 2% by weight.

The titanium-containing solid component a) obtainable in this way is used, together with cocatalysts, ie. aluminum compounds and electron donors, as a Ziegler-Natta catalyst system.

Besides trialkylaluminum, suitable aluminum components are also those in which one alkyl group has been replaced by alkoxy or halogen, for example by chlorine or bromine. Preference is given to trialkylaluminum compounds in which the alkyl groups each have from 1 to 8 carbon atoms, for example trimethylaluminum, triethylaluminum or methyldiethylaluminum.

In addition to the titanium-containing solid component and the aluminum compound, the catalyst systems according to the invention furthermore preferably contain other electron donors, such as monofunctional or polyfunctional carboxylic acids, carboxylic anhydrides and carboxylic acid esters, furthermore ketones, ethers, alcohols, lactones, and organophosphorus and organosilicon compounds. Preferred electron donors are organosilicon compounds of the formula II $$R^3{}_n Si(OR^4)_{4-n} \qquad (II)$$

where $R^3$ is $C_1$- to $C_{12}$-alkyl, 5- to 7-membered cycloalkyl, which may itself carry a $C_1$- to $C_8$-alkyl group, or $C_6$- to $C_{12}$-aryl or $C_6$- to $C_{12}$-arylalkyl, $R^4$ is $C_1$- to $C_{12}$-alkyl, and n is 1, 2 or 3. Particular preference is given to compounds where $R^3$ is $C_1$- to $C_8$-alkyl or 5- to 7-membered cycloalkyl, $R^4$ is $C_1$- to $C_4$-alkyl, and n is 1 or 2.

Of these compounds, dimethoxydiisopropylsilane, dimethoxyisobutylisopropylsilane, dimethoxydiisobutylsilane, dimethoxydicyclopentylsilane and diethoxyisobutylisopropylsilane are particularly suitable.

Preferred catalyst systems are those in which the atomic ratio between aluminum from the aluminum compound b) and titanium from the titanium-containing solid component a) is from 10:1 to 800:1, in particular from 20:1 to 200:1, and the molar ratio between the aluminum compound b) and the electron donor c) is from 1:1 to 100:1, in particular from 2:1 to 80:1.

The catalyst systems according to the invention additionally contain an organometallic compound d) of the general formula (A) or (B)

$$M^1 R^1 \qquad (A)$$

$$M^2 R^1 R^2 \qquad (B)$$

where $M^1$ is an element from main group I, and $M^2$ is an element from main group II of the Periodic Table, and $R^1$ and $R^2$ are identical or different $C_1$-$C_{10}$-alkyl $C_6$-$C_{12}$-aryl, $C_6$-$C_{12}$-arylalkyl or 5- to 7-membered cycloalkyl, which may itself carry $C_1$-$C_8$-alkyl groups. Preference is given to compounds of the general formula (A), and of these, in turn, in particular those where $R^1$ is $C_1$-$C_{10}$-alkyl.

Examples of preferred organometallic compounds are, inter alia, methyllithium, ethyllithium, n-propyllithium, isopropyllithium, n-butyllithium, isobutyllithium, n-pentyllithium, n-hexyllithium, n-heptyllithium, n-octyllithium, methylsodium, ethylsodium, n-propylsodium, isopropylsodium, n-butylsodium, isobutylsodium, n-pentylsodium, n-hexylsodium, methylpotassium, ethylpotassium, n-propylpotassium, isopropylpotassium, n-butylpotassium, n-pentylpotassium and n-hexylpotassium. A particularly preferred organometallic compound is n-butyllithium.

The organometallic compound d) is added to the titanium-containing solid component a), usually before combination with the aluminum component b) and the further electron-donor component c), in the form of a solution in an inert solvent, for example in n-hexane, n-heptane, benzene or toluene. From 0.005 to 0.5 mmol, in particular from 0.01 to 0.5 mmol, of the organometallic compound are preferably used per gram of the titanium-containing solid component a). In a particularly preferred embodiment, the organometallic compound is added to the titanium-containing solid component a) in a storage tank at the inlet to the polymerization reactor, and the suspension obtained is subsequently fed continuously into the reactor.

The catalyst systems according to the invention are particularly suitable for the preparation of polymers of propylene.

The preparation of polymers of propylene can be carried out in conventional reactors used for the polymerization of propylene, either batchwise or preferably continuously, either as a suspension polymerization or preferably as a gas-phase polymerization. Examples of suitable reactors are continuous stirred reactors which contain a fixed bed of finely divided polymer, usually kept in motion by suitable stirring means. It is of course also possible to carry out the reaction in a series of one or more consecutive reactors. The reaction duration is crucially dependent on the polymerization conditions chosen in each case, and is usually from 0.2 to 20 hours, mostly from 0.5 to 10 hours.

For the purposes of the present invention, propylene polymers are taken to mean homopolymers of propylene and copolymers of propylene containing minor amounts of other alk-1-enes having from 2 to 12 carbon atoms, eg. of ethylene, but-1-ene, pent-1-ene, 4-methylpent-1-ene, hex-1-ene, hept-1-ene and oct-1-ene. Particularly suitable comonomers are ethylene and but-1-ene.

The catalyst system according to the invention is particularly suitable for the preparation of propylene homopolymers, of random, alternating or block propylene-ethylene copolymers containing up to 20% by weight of copolymerized ethylene, and of terpolymers of propylene with up to 20% by weight of copolymerized comonomers.

The polymerization reaction is expediently carried out at from 20 to 160° C. and at from 1 to 100 bar, preferably at from 40 to 120° C. and at from 10 to 80 bar. The molecular weight of the polyolefins formed can be controlled by adding regulators which are customary in polymerization technology, for example hydrogen, and adjusted to a narrower distribution. It is also possible to use inert solvents, for example toluene or hexane, inert gases, such as nitrogen or argon, and minor amounts of polypropylene powder.

The polymers obtainable using the catalyst system according to the invention generally have mean molecular weights $M_w$ of from 10,000 to 1,000,000 and melt flow indices in the range from 0.1 to 500 g/10 min, preferably from 0.2 to 250 g/10 min, in each case measured in accordance with DIN 53 735 at 230° C. and 2.16 kg. The melt flow index corresponds to the amount of polymer forced out of a tester standardized in accordance with DIN 53 735 within 10 minutes at 230° C. and under a weight of 2.16 kg.

Using the catalyst system according to the invention, both the productivity and the crystallinity are improved in the polymerization of propylene. The polymers obtainable in this way have a low content of catalyst residues, for example of chlorine, a high bulk density, and, in particular, a significantly reduced proportion of very fine grains (grain size <125 mm).

Due to their good mechanical properties, the propylene polymers prepared using the catalyst system according to the invention are particularly suitable as materials for films and moldings.

EXAMPLES

1. Preparation of the titanium-containing solid component (a)

In a first step, butyloctylmagnesium dissolved in n-heptane was added to $SiO_2$ having a particle diameter of from 20 to 45 μm, a pore volume of 1.75 cm³/g and a surface area of 320 M²/g, 0.3 mol of the magnesium compound being employed per mol of $SiO_2$. The reaction mixture was stirred at 90° C. for 1.5 hours and then cooled to 20° C., and 10 times the molar amount, based on the organo-magnesium compound, of hydrogen chloride was then passed in. After 30 minutes, the solid product was separated from the solvent.

n-Heptane was added to the product from the first step, and 3 mol of ethanol, based on 1 mol of magnesium, were subsequently added with constant stirring. This mixture was stirred at 80° C. for 1.5 hours, and 6 mol of titanium tetrachloride and 0.5 mol of di-n-butyl phthalate, in each case based on 1 mol of magnesium, were then added. The reaction mixture was stirred for a further two hours, and the solid was then separated from the solvent by filtration.

The product obtained was extracted for two hours at 125° C. with a 15% strength by weight solution of titanium tetrachloride in ethylbenzene. The solid product was then separated from the extractant by filtration and washed with n-heptane until the extractant only contained 0.3% by weight of titanium tetrachloride.

The resultant titanium-containing solid component contained 3.1% by weight of titanium, 7.5% by weight of magnesium and 28.3% by weight of chlorine. 2. Polymerization Gaseous propylene was passed into an 800 l reactor provided with a stirrer at 32 bar and 80° C., and was polymerized continuously at a mean residence time of 3 hours with the aid of a Ziegler-Natta catalyst system. 3.3 g of the titanium-containing solid component a) prepared in accordance with 1, 300 mmol of triethylaluminum and 6 mmol of dimethylisobutylisopropylsilane as catalyst constituents were used per hour, and were each metered separately into the reactor. The titanium-containing solid component a) had previously been treated with a 0.1 molar solution of n-butyllithium in n-heptane, this solution being added to the titanium-containing solid component a) in such an amount that the resultant suspension contained 0.025 mmol of n-butyllithium per gram of the titanium-containing solid component a).

When the gas-phase polymerization was complete, a polypropylene having a melt flow index of 8 g/10 min, at 230° C. and 2.16 kg (in accordance with DIN 53 735), was obtained. The productivity of the catalyst system employed, ie. the ratio between the amounts of polypropylene produced and the titanium-containing solid component a) employed, the crystallinity, ie. the proportion of xylene-insoluble polymers, the proportion of very fine grains (<125 μm), and the chlorine content and the bulk density of the polypropylene obtained are shown in the Table below.

COMPARATIVE EXAMPLE

Propylene was polymerized under the conditions of the Example according to the invention, but the addition of the organometallic compound n-butyllithium to the titanium-containing solid component a) was omitted.

When the gas-phase polymerization was complete, a polypropylene having a melt flow index of 8 g/10 min, at 230° C. and 2.16 kg (in accordance with DIN 53 735), was obtained. The productivity of the catalyst system employed and the crystallinity, the proportion of very fine grains, the chlorine content and the bulk density of the polypropylene obtained are shown in the Table below.

TABLE

|  | Example | Comparative Example |
|---|---|---|
| Productivity (g of polypropylene/g of titanium-containing solid component) | 25,000 | 25,000 |
| Crystallinity (xylene-insoluble proportion) [% by weight] | 97.5 | 97.5 |
| Proportion of very fine grains (<125 μm) [% by weight] | 0.3 | 2.5 |
| Chlorine content [ppm] | 10 | 10 |
| Bulk density*) [g/l] | 440 | 420 |

*)in accordance with DIN 53 466

It can be seen from the Table that the polypropylenes prepared using the catalyst system according to the invention have a reduced proportion of very fine grains and have increased bulk density.

We claim:

1. A Ziegler-Natta catalyst system consisting essentially of:
   a) a titanium-containing solid component which also contains magnesium, halogen and a carboxylic acid ester as electron donor,
   b) a trialkylaluminum compound, each of the alkyl substituents of which has 1 to 8 carbon atoms,
   c) a further electron-donor component, and, as an additional component,
   d) an organometallic compound of the formula $M^1R^1$ where $M^1$ is an element from Group I of the Periodic Table and $R^1$ is $C_1$–$C_{10}$-alkyl, $C_8$–$C_{12}$-aryl, $C_8$–$C_{12}$-arylalkyl, or 5- to 7-membered cycloalkyl, which may itself carry $C_1$–$C_8$-alkyl groups.

2. A catalyst system as claimed in claim 1, in which the further electron-donor component c) is a silicon component of the general formula II $$R^3_n Si(OR^4)_{4-n} \qquad (II)$$

where $R^3$ is $C_1$–$C_{12}$-alkyl, 5- to 7-membered cycloalkyl, which may itself carry a $C_1$- to $C_8$-alkyl group, or $C_6$- to $C_{12}$-aryl or $C_6$- to $C_{12}$-arylalkyl, $R^4$ is $C_1$- to $C_{12}$-alkyl, and n is 1, 2 or 3.

3. The catalyst system of claim 1 wherein, $R^1$ is $C_1$–$C_{10}$-alkyl.

4. A process for the preparation of a catalyst system as claimed in claim 1, which comprises adding from 0.005 to 0.5 mmol, based on 1 g of the titanium-containing solid component a), of the organometallic compound d) to the titanium-containing solid component a) after the preparation thereof, and subsequently combining the composition thereby obtained with the aluminum component b) and the further electron-donor component c).

* * * * *